(12) United States Patent
Gross

(10) Patent No.: US 9,682,533 B1
(45) Date of Patent: Jun. 20, 2017

(54) METHODS TO FORM ELECTRICAL-MECHANICAL CONNECTIONS BETWEEN TWO SURFACES, AND SYSTEMS AND COMPOSITIONS SUITABLE FOR SUCH METHODS

(71) Applicant: HRL Laboratories, LLC, Malibu, CA (US)

(72) Inventor: Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/849,316

(22) Filed: Sep. 9, 2015

Related U.S. Application Data

(60) Provisional application No. 62/047,782, filed on Sep. 9, 2014.

(51) Int. Cl.
| | |
|---|---|
| *B23K 31/02* | (2006.01) |
| *B32B 15/04* | (2006.01) |
| *B32B 7/04* | (2006.01) |
| *B23K 35/26* | (2006.01) |
| *B23K 35/02* | (2006.01) |

(52) U.S. Cl.
CPC ............ *B32B 15/04* (2013.01); *B23K 35/025* (2013.01); *B23K 35/26* (2013.01); *B32B 7/04* (2013.01); *B32B 2307/202* (2013.01); *B32B 2605/00* (2013.01)

(58) Field of Classification Search
CPC . B23K 35/26; B23K 2201/36–2201/42; B23K 3/0638; B23K 35/0244–35/025; B23K 1/00; B32B 15/04; B32B 7/04; B32B 2605/00; B32B 2307/202
USPC ..... 228/179.1–180.22, 245–262, 121–124.7; 148/23–24
See application file for complete search history.

(56) References Cited

U.S. PATENT DOCUMENTS

| | | | | |
|---|---|---|---|---|
| 5,056,706 A | * | 10/1991 | Dolbear | ................. B23K 31/02 228/180.21 |
| 5,170,930 A | * | 12/1992 | Dolbear | ................... H01B 1/02 228/123.1 |

(Continued)

FOREIGN PATENT DOCUMENTS

WO     WO 9615283 A1 *  5/1996  .......... B23K 35/025

*Primary Examiner* — Kiley Stoner
(74) *Attorney, Agent, or Firm* — O'Connor & Company

(57) ABSTRACT

Gallium peritectics have not been previously used to bond a metallic surface to a non-metallic surface. The invention provides a metallic gap filler which is a solid metal created by mixing a solid metal powder or film with a Ga-containing liquid metal that creates an electrical and mechanical connection between two dissimilar surfaces. The resulting gap filler conforms to the roughness of both surfaces, which improves adhesion. The methods disclosed do not require the application of temperatures that could damage either surface. An electrical and mechanical shim can be created from a flowable paste. A hardenable metallic paste for bonding a metallic surface to a non-metallic surface includes a Ga-containing liquid metal, optionally including one or more dissolved metals selected from the group consisting of In, Sn, Zn, and Bi; and a solid metal selected from the group consisting of Cu, Ag, Ni, Sn, and combinations thereof.

13 Claims, 1 Drawing Sheet

(56) References Cited

U.S. PATENT DOCUMENTS

| | | | | |
|---|---|---|---|---|
| 5,328,087 A * | 7/1994 | Nelson | C09J 9/02 | 156/273.9 |
| 5,419,806 A * | 5/1995 | Huebner | H01L 23/48 | 216/18 |
| 5,445,308 A * | 8/1995 | Nelson | C09J 9/02 | 228/121 |
| 5,522,535 A * | 6/1996 | Ivanov | B23K 1/0008 | 204/298.13 |
| 5,593,082 A * | 1/1997 | Ivanov | B23K 35/025 | 204/298.12 |
| 5,985,043 A * | 11/1999 | Zhou | B23K 35/025 | 148/24 |
| 6,027,575 A * | 2/2000 | Paruchuri | B23K 35/26 | 148/24 |
| 6,121,689 A * | 9/2000 | Capote | B23K 35/025 | 257/773 |
| 6,184,475 B1 * | 2/2001 | Kitajima | B23K 35/025 | 174/257 |
| 6,214,131 B1 * | 4/2001 | Hua | B23K 35/025 | 148/24 |
| 2006/0243779 A1 * | 11/2006 | Rau | C03C 27/046 | 228/116 |
| 2007/0228109 A1 * | 10/2007 | Smith | B23K 35/262 | 228/176 |
| 2007/0281126 A1 * | 12/2007 | Lahann | C09J 5/04 | 428/98 |
| 2010/0035072 A1 * | 2/2010 | Watanabe | B22F 1/0059 | 428/457 |
| 2010/0068552 A1 * | 3/2010 | Goerlich | C22C 13/00 | 428/615 |
| 2011/0240716 A1 * | 10/2011 | Zinn | B23K 1/0008 | 228/119 |
| 2012/0211549 A1 * | 8/2012 | Yamakami | B22F 1/0014 | 228/256 |
| 2013/0001775 A1 * | 1/2013 | Nishikubo | H01L 24/13 | 257/737 |
| 2014/0023777 A1 * | 1/2014 | Sekine | H05K 3/4038 | 427/97.7 |
| 2014/0079472 A1 * | 3/2014 | Oppermann | B23K 35/262 | 403/272 |
| 2014/0079881 A1 * | 3/2014 | Botstein | B23K 35/325 | 427/205 |
| 2014/0144971 A1 * | 5/2014 | Conn | H05K 3/3436 | 228/102 |
| 2014/0263588 A1 * | 9/2014 | Zhong | B23K 1/20 | 228/248.1 |
| 2015/0298248 A1 * | 10/2015 | Walker | B23K 20/023 | 428/216 |

* cited by examiner

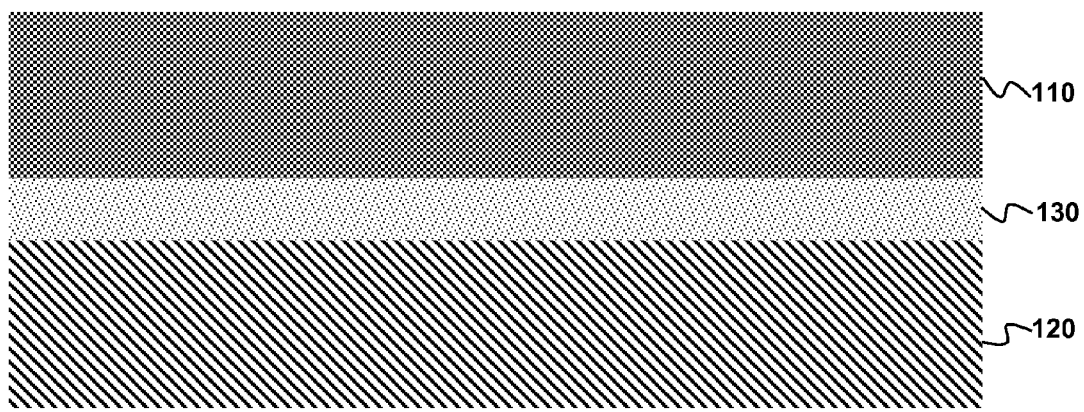

METHODS TO FORM ELECTRICAL-MECHANICAL CONNECTIONS BETWEEN TWO SURFACES, AND SYSTEMS AND COMPOSITIONS SUITABLE FOR SUCH METHODS

PRIORITY DATA

This patent application is a non-provisional application claiming priority to U.S. Provisional Patent App. No. 62/047,782 for "METALLIC GAP FILLER," filed on Sep. 9, 2014, which is hereby incorporated by reference herein.

FIELD OF THE INVENTION

The present invention generally relates to the formation of electrical and mechanical metallic connections between two different surfaces.

BACKGROUND OF THE INVENTION

Creating an electrical and mechanical connection between two dissimilar surfaces is important for grounding and creating mechanically robust vehicles.

For example, lightning protection of composite structures, which are extensively used on new aircrafts and other vehicles, is complex due to the inherent electrical resistance of carbon fibers and epoxy, as well as the multi-layer construction. The intrinsic high conductivity of metallic fasteners means that lightning currents may create detrimental ignition sources by flowing current through a metallic fastener to another point, thereby creating arcing between fastener and the composite structure.

Currently, creating an electrical and mechanical connection between two dissimilar surfaces can be done in various ways.

A metallic solder can be used to create a connection. However, this requires high temperatures that both surfaces may not be able to tolerate. For example, carbon fiber composites cannot be exposed to over 254° C., which is below the melting temperature of many solders.

A conductive adhesive may be employed. However, conductive adhesives are more resistive than a metallic bond. This can result in a charge differential between the two surfaces and electrostatic discharge. Also, conductive adhesives generally do not provide a high degree of mechanical strength.

A soft metallic insert may be incorporated between the two surfaces, followed by bolting the surfaces together. However, this creates a weak point between two surfaces.

Other methods to connect two surfaces such as welding are not possible if one of the surfaces is non-metallic.

Gallium-based peritectics have been proposed as dental filling materials in Smith et al., "Alloys of gallium with powdered metals as possible replacement for dental amalgam" *J. Am. Dent. Assoc.* 1956, 53, 315-324; Smith et al., "Some physical properties of gallium-copper-tin alloys" *J. Am. Dent. Assoc.* 1956, 53, 677-685; Dunne et al., "A 3-year longitudinal, controlled clinical study of a gallium-based restorative material" *British Dental Journal* 2005, 198, 355-359, and U.S. Pat. No. 2,864,695 (Dec. 16, 1958). However, these publications do not describe the use of these peritectics to bond two dissimilar surfaces. They are just intended to fill holes in dental procedures.

Eutectic bonding, also referred to as eutectic soldering, is a wafer bonding technique with an intermediate metal layer that can produce a eutectic system. Eutectic bonding is used to bond semiconductor components and wafers. This bonding occurs at elevated temperatures (>100° C.) and does not use a Ga-based liquid metal.

What is needed is a metallic gap filler, which creates an electrical and mechanical connection between two dissimilar surfaces where one of the surfaces is non-metallic. Methods of creating these metallic gap fillers, compositions useful for filling gaps between surfaces, and resulting systems are desired commercially.

SUMMARY OF THE INVENTION

The present invention addresses the aforementioned needs in the art, as will now be summarized and then further described in detail below.

In some variations, the invention provides a method for forming an electrical and mechanical connection between two surfaces, the method comprising:

(a) obtaining a first component comprising a solid metal;

(b) obtaining a second component comprising a liquid metal, wherein the liquid metal has a melting temperature of about 100° C. or less;

(c) introducing the first and second components to a region of space between a first surface and a second surface, wherein the first and second components form, or are present as, a metallic paste; and (d) solidifying the metallic paste to form a solid metallic filler that electrically and mechanically connects the first and second surfaces to each other.

In some embodiments, the first surface is metallic and the second surface is non-metallic. In some embodiments, each of the first and second surfaces is electrically conductive.

In some embodiments, the method comprises mixing the first and second components to form the metallic paste, prior to step (c). In alternative embodiments, the first and second components may be introduced separately to the region of space between the first and second surfaces, and subsequently, the components form a metallic paste and/or solidify directly to form the solid metallic filler.

The first component may be in the form of a powder, a film, or a layer, for example. In certain embodiments, the first component is present on the first surface or on the second surface, prior to step (d).

Solidifying in step (d) may be room-temperature hardening of the metallic paste to form the solid metallic filler. That is, no external cooling of the metallic paste is necessary, other than heat rejected to the environment, in some embodiments of the invention.

In some embodiments, the solid metal is characterized by an average particle size or film thickness from about 500 nanometers to about 200 microns. The solid metal may be selected from the group consisting of Cu, Ag, Ni, Sn, and combinations thereof.

The liquid metal preferably contains Ga in a concentration of at least 50 atom % based on the liquid metal contained in the second component. Optionally, the second component further contains one or more additional metals dissolved in the second component, wherein the additional metals are selected from the group consisting of In, Sn, Zn, and Bi. The liquid metal may be characterized by a melting temperature of about 50° C. or less, such as about 30° C. or less.

Other variations of the invention provide a system containing an electrical and mechanical connection between two surfaces, the system comprising:

(a) a metallic first surface;
(b) a non-metallic conductive second surface disposed distally from the first surface; and
(c) a Ga-containing solid metallic region disposed between, and electrically and mechanically connecting, the first and second surfaces.

In some embodiments, the metallic region contains Ga in a concentration of at least 10 atom % based on the metallic region. In certain embodiments, the metallic region contains Ga in a concentration of at least 25 atom % based on the metallic region.

The metallic region may further contain a solid metal selected from the group consisting of Cu, Ag, Ni, Sn, and combinations thereof. Alternatively, or additionally, the metallic region may further contain an additional metal (besides Ga) selected from the group consisting of In, Sn, Zn, and Bi.

In some embodiments, the metallic region is derived from a metallic paste containing a solid metal and a liquid metal. In preferred embodiments, the metallic region completely fills the space between the first and second surfaces. The first and second surfaces may form a planar gap containing the metallic region or some other gap geometry, or an irregular gap containing the metallic region. The gap may be a one-dimensional gap (point connection), a two-dimensional gap (e.g., connection of surfaces, or layers), or a three-dimensional gap (e.g., connection of materials in all directions).

The metallic region may be characterized by an electrical resistivity of less than 0.1 Ω·cm. In some embodiments, the metallic region is characterized by a half-cell electrochemical reduction potential from about −0.77 V to about +0.34 V versus standard hydrogen electrode. The metallic region may be, or may be a part of, a corrosion-protection layer between the first and second surfaces.

Other variations of the invention provide a flowable and hardenable metallic paste for bonding a metallic surface to a non-metallic surface, the metallic paste comprising (i) a Ga-containing liquid metal, optionally including one or more dissolved metals selected from the group consisting of In, Sn, Zn, and Bi, wherein the liquid metal has a melting temperature of about 100° C. or less; and (ii) a solid metal selected from the group consisting of Cu, Ag, Ni, Sn, and combinations thereof.

The metallic paste may be characterized by an average particle from about 500 nanometers to about 200 microns. In some embodiments, the metallic paste contains Ga in a concentration of at least 10 atom % or at least 25 atom % based on the metallic paste. The liquid metal has a melting temperature of about 50° C. or less, such as about 30° C. or less, in some embodiments.

The metallic paste may be characterized by a half-cell electrochemical reduction potential from about −0.77 V to about +0.34 V versus standard hydrogen electrode.

The metallic paste may be produced, transported, sold, etc. In some embodiments, the metallic paste is introduced to and/or present between the metallic surface and the non-metallic surface. Also provided is a metallic paste contained in a kit with instructions for forming an electrical-mechanical shim between the metallic surface and the non-metallic surface. In a specific embodiment, the metallic paste is present between an aluminum-containing surface and a carbon-containing surface.

BRIEF DESCRIPTION OF THE DRAWING(S)

FIG. 1 is a schematic diagram of an exemplary system of the invention, the system containing a metallic first surface, a non-metallic conductive second surface, and a gallium-containing solid metallic gap filler that forms an electrical and mechanical connection between the two surfaces.

DETAILED DESCRIPTION OF EMBODIMENTS OF THE INVENTION

The compositions, systems, structures, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter. With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of".

Some variations of the present invention are premised on a solid metallic gap filler that is created by mixing a solid metal with a gallium (Ga)-containing liquid metal, to create an electrical and mechanical connection between two dissimilar surfaces, including non-metallic surfaces.

Ga peritectics (solids formed from solid+liquid) have not been previously used to bond a metallic surface to a non-metallic surface; they have only been used in dental fillings.

In some embodiments, the invention provides a metallic gap filler which is a solid metal created by mixing a solid metal powder or film with a Ga-containing liquid metal that creates an electrical and mechanical connection between two dissimilar surfaces, where one surface is non-metallic. Because Ga wets almost any surface, good mechanical contact is achieved between the Ga (or a Ga-containing alloy) and both surfaces that are joined, which increases adhesion.

In contrast to the prior art, the methods disclosed herein form a metallic bond that works even with high roughness in one or both different surfaces. Because a liquid metal is used as a reactant, the resulting gap filler conforms to the roughness of both surfaces, which improves adhesion. Also, the methods disclosed herein do not require the application of temperatures that could damage either surface.

Some variations of this invention will create an electrical and mechanical shim from a flowable paste, rather than relying on solid machined shims. A "shim" is a thin and often tapered or wedged piece of material, used to fill small gaps or spaces between objects. Shims are typically used in order to support, adjust for better fit, or provide a level surface. Shims may also be used as spacers to fill gaps between parts subject to wear.

In some variations, the invention provides a method for forming an electrical and mechanical connection between two surfaces, the method comprising:

(a) obtaining a first component comprising a solid metal;

(b) obtaining a second component comprising a liquid metal, wherein the liquid metal has a melting temperature of about 100° C. or less;

(c) introducing the first and second components to a region of space between a first surface and a second surface, wherein the first and second components form, or are present as, a metallic paste; and (d) solidifying the metallic paste to form a solid metallic filler that electrically and mechanically connects the first and second surfaces to each other.

In some embodiments, the first surface is metallic (e.g., aluminum, stainless steel, titanium, etc.) and the second surface is non-metallic (e.g., ceramic, glass, polymeric, carbon, etc.). In some embodiments, each of the first and second surfaces is electrically conductive. Electrically conductive surfaces may be metallic or non-metallic (e.g., carbon, graphite, graphene, conducting polymers, conducting glass, etc.).

As intended herein, a "metallic paste" means a thick viscous fluid containing one or more metals. The viscosity (at 25° C.) of the metallic paste is at least about $10^2$ Pa·s, and may be (in various embodiments) on the order of $10^3$ Pa·s, $10^4$ Pa·s, $10^5$ Pa·s, or $10^6$ Pa·s. The metallic paste is flowable under the force of gravity or under a pressure force or mechanical stress. The metallic paste behaves as a solid or a liquid, depending on applied load and timescale. The metallic paste preferably conforms to surfaces without external pressure, via diffusion and/or wetting.

The viscosity increases, typically significantly, upon hardening of the metallic paste to form the metallic region. In terms of viscosity, the hardened metallic region has a viscosity (at 25° C.) higher than the viscosity of the metallic paste, and typically greater than $10^6$ Pa·s, $10^7$ Pa·s or more. In certain embodiments, the viscosity increases significantly upon hardening, but some amount or phase of liquid remains in the metallic region. This may be due to equilibrium or kinetic reasons, localized regions that did not completely harden, non-isothermal temperatures, etc. The metallic region may still form an electrical and mechanical connection within the meaning set forth herein.

The metallic paste is generally inorganic, which means it does not contain carbon, hydrogen, and oxygen. For purposes of this disclosure, "inorganic" means that the paste contains no greater than 5 wt %, preferably no greater than 2 wt %, and more preferably no greater than 1 wt % of organic species. In some embodiments, the metallic paste contains essentially no organic species except for minor or trivial impurities (e.g., carbon-containing dust).

By "electrically and mechanically connects," "electrical and mechanical connection," and the like, it is meant a solid-phase region that is electrically conductive and physically continuous between the two surfaces being connected. The conductivity may be characterized by an electrical resistivity of less than 1 Ω·cm, preferably less than 0.1 Ω·cm. The solid-phase region is a solid at room temperature and/or a temperature of intended use (which may be lower or higher than 25° C.). The physical continuity may be characterized by various mechanical properties, which generally are not limited. For example, the tensile strength of the solid-phase region may be at least about 1 MPa, such as at least about 10 MPa, 50 MPa, 100 MPa, 250 MPa, 500 MPa, 1000 MPa, of greater. The cleavage strength of the solid-phase region, with respect to its adhesion of the two surfaces to each other, may be at least about 0.1 MPa, such as at least about 0.5 MPa, 1 MPa, 5 MPa, 10 MPa, or greater. Some embodiments do not require an especially high tensile strength or cleavage strength.

In some embodiments, the method comprises mixing the first and second components to form the metallic paste, prior to step (c). In alternative embodiments, the first and second components may be introduced separately to the region of space between the first and second surfaces, and subsequently, the components form a metallic paste. The first and/or second components may be added already in paste form, or in another form, such as a liquid solution or slurry, powder, flakes, needles, or thin sheets, for example. In certain embodiments, the first and second components may be introduced separately to the region of space between the first and second surfaces, and subsequently solidify together directly to form the solid metallic filler, without intermediate formation of a metallic paste.

The first component may be in the form of a powder, a film, or a layer, for example. In certain embodiments, the first component is present on the first surface or on the second surface, prior to step (d). That is, one of the surfaces may already contain a first component comprising a solid metal.

Solidifying in step (d) may be room-temperature hardening of the metallic paste to form the solid metallic filler. That is, no external cooling of the metallic paste is necessary—other than heat rejected to the environment under ambient conditions—in preferred embodiments of the invention. In other embodiments, external cooling (such as indirect heat exchange) is used to assist in the hardening process.

In some embodiments, the solid metal is characterized by an average particle size or film thickness from about 500 nanometers to about 200 microns, such as about 1 micron, 5 microns, 10 microns, 25 microns, 50 microns, or 100 microns.

In some embodiments, the solid metal may be selected from the group consisting of Cu, Ag, Ni, Sn, and combinations thereof. In various embodiments, the solid metal may be selected from the group consisting of Li, Be, Ma, Mg, K, Ca, Sc, Y, Ti, Zr, Hf, V, Nb, Ta, Cr, Mo, W, Mn, Tc, Re, Fe, Ru, Os, Fe, Rh, Ir, Ni, Pd, Pt, Cu, Ag, Au, Zn, Cd, Al, Si, B, C, P, S, Ga, Ge, In, Sn, Sb, Pb, Bi, La, Ac, Ce, Th, Nd, U, and combinations or alloys thereof.

The liquid metal need not contain pure Ga. The liquid metal may contain Ga in a concentration of about, or at least about, 10 at % (atom %), 20 at %, 30 at %, 40 at %, 50 at %, 60 at %, 70 at %, 80 at %, or 90 at %, based on the liquid metal contained in the second component. The liquid metal preferably contains Ga in a concentration of at least 50 at % based on the liquid metal contained in the second component.

Optionally, the second component further contains one or more additional metals dissolved in the second component, wherein the additional metals are selected from the group consisting of In, Sn, Zn, and Bi. The one or more additional metals dissolved in the second component may be present in a concentration, individually or collectively, of about, or at least about, 0.5 at %, 1 at %, 2 at %, 5 at %, 10 at %, 15 at %, 20 at %, 25 at %, 30 at %, 35 at %, 40 at %, 45 at %, or 50 at %.

The liquid metal may be characterized by a melting temperature of about embodiments, the liquid metal is characterized by a melting temperature of about 20° C., 21° C., 22° C., 23° C., 24° C., 25° C., 26° C., 27° C., 28° C., or 29° C. Most preferably, the liquid metal is characterized by a melting temperature below 28° C. In other embodiments, the liquid metal is characterized by a melting temperature less than 20° C., such as about 15° C., 10° C., 5° C., 0° C., −5° C., −10° C., or −15° C.

Variations of the invention allow forming a solid metal alloy at a temperature much lower than the melting point of the final alloy (see Examples herein). This low-temperature formation property is realized because Ga can diffuse into many solid metals at room temperature. See Yatsenko et al., "Dissolution rates and solubility of some metals in liquid gallium and aluminum" *Journal of Physics: Conference Series* 2008, 98, 062032, which is hereby incorporated by reference herein.

Gallium is a soft, silvery, relatively non-toxic metal that can diffuse into many solid metals at room temperature. Gallium is also notable for having one of the largest liquid temperature ranges for a metal, and for having a low vapor pressure at high temperatures. Gallium easily alloys with many metals. It can by a liquid alloy with elements such as (but not limited to) In, Sn, Bi, or Zn. When Ga is mixed with a solid metal powder or film, it will form an alloy of Ga and the other metal (e.g., Cu, Ag, Ni, Sn, etc.). Gallium is found primarily in the +3 oxidation state. The +1 oxidation state of Ga is also present in some Ga-containing compounds.

Gallium is very reactive with some metals, even at room temperature. At high temperatures, gallium dissolves most metals, although some metals, including Na, K, Au, Mg, Pb, Ni and Hg, are only slightly soluble at moderate temperatures. Ga-containing alloys will wet most metallic surfaces once oxides (if present) have been sufficiently removed from the substrate surface.

Gallium has an ordinary melting temperature of 29.8° C. Alloys of gallium and one or more other metals may have a lower or a higher melting temperature or liquidus temperature. Several Ga alloys with very low melting points are liquid at room temperature, or below room temperature (such as certain alloys that contain gallium, indium, and tin, and melts below −20° C. Other examples include 95 at % Ga/5 at % In (indium) with liquidus temperature of 25.0° C., 75.5 at % Ga/24.5 at % In eutectic alloy with liquidus temperature of 15.7 C, and 62.5 at % Ga/21.5 at % In/16.0 at % Sn eutectic alloy with liquidus temperature of 10.7° C.

Note that when Ga-containing alloys are employed with melting or liquidus temperatures less than room temperature, the alloy itself would not harden at room temperature. However, the metallic paste (of which the Ga-containing alloy is a component) does harden at room temperature, due to the presence of high-melting metals.

Other variations of the invention provide a system containing an electrical and mechanical connection between two surfaces, the system comprising:

(a) a metallic first surface;
(b) a non-metallic conductive second surface disposed distally from the first surface; and
(c) a Ga-containing solid metallic region disposed between, and electrically and mechanically connecting, the first and second surfaces.

FIG. 1 is a schematic diagram of an exemplary system 100 of the invention. The system 100 of FIG. 1 contains a metallic first surface 110, a non-metallic conductive second surface 120, and a gallium-containing solid metallic region 130 that forms an electrical and mechanical connection between the two surfaces 110 and 120. When a metallic paste is introduced to a region of space between the first surface 110 and the second surface 120 (as described in methods above), the metallic paste may be hardened to form the solid metallic region 130. Each of the surfaces 110 and 120 may contain various additives and fillers. Also, each of the surfaces 110 and 120 may be disposed on substrates (not shown) distally away from the solid metallic region 130 (i.e., the outer portions of the diagram). If present, such substrates may also be metals or other materials, such as metal oxides, ceramics, etc.

The thicknesses of the first surface 110, the second surface 120, and the solid metallic region 130 are not particularly limited. The first and second surfaces 110,120 may be very large or surfaces of large structures, such as vehicles. The solid metallic region 130 may vary from very small gaps (in the nanometer to micron range) to large gaps (such as in the millimeter to centimeter or even meter range).

Multiple solid metallic regions may also be present, such as when a third surface is present, disposed distally away from one of the first or second surfaces (e.g., multi-layer structures). When multiple solid metallic regions are present, they may be fabricated from different metallic paste compositions.

In some embodiments, the metallic region contains Ga in a concentration of at least 10 at % based on the metallic region. In certain embodiments, the metallic region contains Ga in a concentration of at least 25 at % based on the metallic region. In various embodiments, the metallic region contains Ga in a concentration of about, or at least about, 10 at %, 15 at %, 20 at %, 25 at %, 30 at %, 35 at %, 40 at %, 45 at %, or 50 at %, based on the metallic region. The metallic region may further contain an additional metal (besides Ga) selected from the group consisting of In, Sn, Zn, and Bi. Such additional metals may be present, individually or collectively, in a concentration of about, or at least about, 0.1 at %, 0.5 at %, 1 at %, 2 at %, 5 at %, 10 at %, 15 at %, 20 at %, or 25 at %, based on the metallic region.

The metallic region may further contain a solid metal selected from the group consisting of Cu, Ag, Ni, Sn, and combinations thereof. In various embodiments, the metallic region contains such solid metal in a concentration of about, or at least about, 5 at %, 10 at %, 15 at %, 20 at %, 25 at %, 30 at %, 35 at %, 40 at %, 45 at %, or 50 at %, based on the metallic region.

In some embodiments, the metallic region is derived from a metallic paste containing a solid metal and a liquid metal.

In preferred embodiments, the metallic region completely fills the space between the first and second surfaces. In some embodiments, the metallic region incompletely fills the space between the first and second surfaces, but nevertheless forms an electrical and mechanical connection. For instance, there may be porosity in the metallic region, but still material connections that enable electrical conduction and mechanical stress distribution. The first and second surfaces may form a planar gap containing the metallic region or some other gap geometry, or an irregular gap containing the metallic region. A gap containing the metallic region may be referred to herein as a "gap filler."

The metallic region may be characterized by an electrical resistivity of less than 0.1 Ω·cm, such as less than about 0.01 Ω·cm, 0.001 Ω·cm, or lower.

In certain embodiments, the metallic region is characterized by a half-cell electrochemical reduction potential from about −0.77 V to about +0.34 V versus standard hydrogen electrode. For example, the metallic region may be characterized by a half-cell electrochemical reduction potential of about −0.7 V, −0.6 V, −0.5 V, −0.4 V, −0.3 V, −0.2 V, −0.1 V, 0.0 V, +0.1 V, +0.2 V, or +0.3 V versus standard hydrogen electrode.

Typically, the Ga-containing solid metallic region is homogeneous, i.e. a single phase. In some embodiments, the Ga-containing solid metallic region is heterogeneous. It is also possible to incorporate, into the metallic paste, additives which are not fully present into a single phase in the final metallic region, either because the additives do not melt, or because they form a separate solid phase in the hardening process. Such additives may be metallic or ceramic in nature, and may themselves be core-shell structures or nanostructures.

Other variations of the invention provide a flowable and hardenable metallic paste for bonding a metallic surface to a non-metallic surface, the metallic paste comprising (i) a Ga-containing liquid metal, optionally including one or more dissolved metals selected from the group consisting of In, Sn, Zn, and Bi, wherein the liquid metal has a melting temperature of about 100° C. or less; and (ii) a solid metal selected from the group consisting of Cu, Ag, Ni, Sn, and combinations thereof.

The metallic paste may be characterized by an average particle from about 500 nanometers to about 200 microns. In some embodiments, the metallic paste contains Ga in a concentration of at least 10 atom % or at least 25 atom % based on the metallic paste. The liquid metal has a melting temperature of about 50° C. or less, such as about 30° C. or less, in some embodiments.

The metallic paste may be characterized by a half-cell electrochemical reduction potential from about −0.77 V to about +0.34 V versus standard hydrogen electrode. For example, the metallic paste may be characterized by a half-cell electrochemical reduction potential of about −0.7 V, −0.6 V, −0.5 V, −0.4 V, −0.3 V, −0.2 V, −0.1 V, 0.0 V, +0.1 V, +0.2 V, or +0.3 V versus standard hydrogen electrode.

The metallic paste may be produced, transported, sold, etc. In some embodiments, the metallic paste is introduced to and/or present between the metallic surface and the non-metallic surface. Also provided is a metallic paste contained in a kit with instructions for forming an electrical-mechanical shim between the metallic surface and the non-metallic surface. In a specific embodiment, the metallic paste is present between an aluminum-containing surface and a carbon-containing surface. The resulting (hardened) solid-phase region may be utilized as a corrosion protection intermediate layer, such as a layer between carbon fiber and aluminum.

Various structures may incorporate the systems described herein and/or utilize the methods or compositions (metallic paste) described herein. Such structures may be present in a device or system selected from the group consisting of vehicles, corrosion-protection layers, electromechanical systems, optical devices, electronic devices, and electrochemical systems, for example.

EXAMPLES

Example 1: Ga/Sn Liquid Alloy

A 11 wt % Sn in Ga alloy is made. 0.55 g Sn is mixed with 4.45 g Ga and heated at 40° C. for 1 hour until a homogeneous liquid is formed.

Example 2: Ga/Cu Alloy 1 g of the Example 1 Ga/Sn liquid alloy is mixed with 0.624 g of <75 μm Cu particles (Aldrich) in a Wig-L-Bug amalgamator for 30 seconds. This mixture has an excess of Cu that acts as a reinforcing phase and is expected to form the Cu-Ga$_2$ phase that does not melt until 254° C. The material is removed and forms a paste that can fill holes and form an adhered film on glass when solidified. It solidifies at room temperature within 5 minutes. Electrodes spaced at 1 cm apart on solidified alloy measure an electrical resistance <0.1Ω.

Example 3: Ga/Ag Alloy 1 g of the Example 1 Ga/Sn liquid alloy is mixed with 0.979 g of <45 μm Cu particles (Alfa Aesar) in a Wig-L-Bug amalgamator for 30 seconds. This mixture has a 10% excess of Ag and is expected to form the Ag—Ga δ phase that does not melt until 326° C. The material is removed and forms a paste that can fill holes and form an adhered film on a steel plate when solidified. It solidifies at room temperature within 5 minutes.

Example 4: Ga/Ag Alloy 1 g of a 75.5 wt % Ga/24.5 wt % In liquid alloy (Indium Corporation) is mixed with 0.931 g of <45 μm Cu particles (Alfa Aesar) in a Wig-L-Bug amalgamator for 30 seconds. This mixture has an excess of Ag and is expected to form the Ag—Ga δ phase that does not melt until 326° C. The material is removed and forms a paste that can fill holes. It solidifies at room temperature within 5 minutes.

Example 5: Ga/Ni alloy 1 g of the Example 1 Ga/Sn liquid alloy is mixed with 0.527 g of <150 μm Ni particles (Aldrich) in a Wig-L-Bug amalgamator for 30 seconds. This mixture has a 10 wt % excess of Ni and is expected to form the Ni$_2$Ga$_3$ phase that does not melt until 895° C. The material is removed and forms a paste that can fill holes and form an adhered film on steel when solidified. It solidifies at room temperature within 5 minutes.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially. All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method for forming an electrical and mechanical connection between two dissimilar surfaces, said method comprising:
   (a) obtaining a first component comprising a solid metal;
   (b) obtaining a second component comprising a liquid metal, wherein said liquid metal has a melting temperature of about 100° C. or less;
   (c) introducing said first and second components to a region of space between a first surface and a second surface, wherein said first and second components form, or are present as, a metallic paste; and
   (d) solidifying said metallic paste to form a solid metallic filler that electrically and mechanically connects said first and second surfaces to each other, wherein said first surface is metallic and said second surface is non-metallic and polymeric.

2. The method of claim 1, said method comprising mixing said first and second components to form said metallic paste, prior to step (c).

3. The method of claim 1, wherein said second surface includes conducting polymers.

4. The method of claim 1, wherein said first component is in the form of a powder.

5. The method of claim 1, wherein said first component is in the form of a film or layer.

6. The method of claim 1, wherein said first component is present on said first surface or on said second surface, prior to step (d).

7. The method of claim 1, wherein said solidifying in step (d) is room-temperature hardening of said metallic paste to form said solid metallic filler.

8. The method of claim 1, wherein said solid metal is characterized by an average particle size or film thickness from about 500 nanometers to about 200 microns.

9. The method of claim 1, wherein said solid metal is selected from the group consisting of Cu, Ag, Ni, Sn, and combinations thereof.

10. The method of claim 1, wherein said liquid metal contains Ga in a concentration of at least 50 atom % based on said liquid metal contained in said second component.

11. The method of claim 10, wherein said second component further contains one or more additional metals dissolved in said second component, wherein said additional metals are selected from the group consisting of In, Sn, Zn, and Bi.

12. The method of claim 1, wherein said liquid metal has a melting temperature of about 50° C. or less.

13. The method of claim 12, wherein said liquid metal has a melting temperature of about 30° C. or less.

* * * * *